United States Patent [19]

Belot et al.

[11] Patent Number: 5,785,900
[45] Date of Patent: Jul. 28, 1998

[54] FLUID DISTRIBUTOR FOR HEAT AND MATERIAL EXCHANGE COLUMN AND PROCESS FOR PRODUCING THE SAME

[75] Inventors: Jean-Marc Belot, La Varenne Saint Hilaire; Jean-Claude Amstad, Saint Maur Des Fosses; Alain Carcone, Le Plessis Trevise; Jean-Claude Dordonnat, Malakoff; Philippe Fraysse, Fontenay Aux Roses; Thierry Gesbert, Villemomble; Philippe Grigoletto, Villeparisis, all of France

[73] Assignee: L'Air Liquide, Societe Anonyme pour l'Etude et l'Exploitation des Procedes Georges Claude, Paris Cedex, France

[21] Appl. No.: 867,982

[22] Filed: Jun. 3, 1997

Related U.S. Application Data

[63] Continuation of Ser. No. 517,288, Aug. 21, 1995, abandoned.

[30] Foreign Application Priority Data

Apr. 4, 1995 [FR] France .................... 95 03967

[51] Int. Cl.$^6$ .................................................. B01F 3/04
[52] U.S. Cl. .................................................. 261/97
[58] Field of Search .................................... 261/97

[56] References Cited

U.S. PATENT DOCUMENTS

| | | |
|---|---|---|
| 2,120,256 | 6/1938 | Mensing .................... 261/114.1 |
| 2,653,018 | 9/1953 | Dunn ........................ 261/114.2 |
| 3,070,360 | 12/1962 | Rafferty et al. . |
| 3,222,040 | 12/1965 | Eckert . |
| 3,524,731 | 8/1970 | Effron et al. .................... 261/97 |
| 5,000,883 | 3/1991 | Leva ................................ 261/97 |
| 5,132,055 | 7/1992 | Alleaume et al. . |

FOREIGN PATENT DOCUMENTS

| | | |
|---|---|---|
| 0 425 481 | 5/1991 | European Pat. Off. . |
| 598617 | 3/1978 | U.S.S.R. ...................... 261/97 |

OTHER PUBLICATIONS

Norton, "Packed Tower Internals", Bulletin TA-80R, p. 8, Dec. 1976.

*Primary Examiner*—Tim R. Miles
*Attorney, Agent, or Firm*—Young & Thompson

[57] ABSTRACT

A fluid distributor for heat and material exchange columns, more particularly of the packed type, comprising profiled elements (2) of inverted U shape with substantially vertical walls (4), and a base (1) in which are formed a plurality of parallel slots (9). Each slot is covered by one of the profiled elements, secured to the base by the walls (4) in a permanent and sealed manner. The base (1) is a flat plate. Each profiled element (2) is fixed to the two opposite edges of its slot (9) by welding. Each of the walls (4) terminates in at least one foot (7) turned inwardly of the element (2) and parallel to the surface of the base (1), the feet (7) serving to attach the elements to the base.

15 Claims, 3 Drawing Sheets

FLUID DISTRIBUTOR FOR HEAT AND MATERIAL EXCHANGE COLUMN AND PROCESS FOR PRODUCING THE SAME

This application is a continuation of application Ser. No. 08/517,288, filed Aug. 21, 1995, now abandoned.

The present invention relates to a fluid distributor for a heat and material exchange column, more particularly of the packed type, and particularly to air distillation columns, of the type comprising a series of adjacent parallel profiled elements defining alternate gas and liquid spaces, each profiled element comprising at least one raised wall portion provided with a row of openings.

A distributor of this type is described in GB-A-2,046,623, in which the distributor is covered with a random packing constituted of bulk elements. The distributor ensures good rigidity in the direction of the gas chimneys and thus in the other directions by profiled gas and liquid openings which moreover reduce the pressure drop and by the compact stamped shape of each juxtaposeable element. Unfortunately, the distributor does not comprise a peripheral channel permitting the establishment in the troughs of liquid of a single liquid level, which condition permits regular distribution of the liquid over the lower packing.

U.S. Pat. No. 5,000,883 discloses a removable distributor for bulk packing comprising an assembly of perforated plates to evacuate the liquid, and whose parallel edges are curved upwardly. These plates bear on a circular ledge secured to the sleeve and comprise a liquid level balancing channel on the different plates. The spaces between the plates, of trapezoidal shape, are covered by the chimneys of inverted U shape having toward their top profiled perforations for the passage of the gas. Unfortunately, the gas chimneys have a rectangular base leaving empty regions which permit bypass of the liquid over the periphery of the column, which is not covered by the chimneys, which gives rise to poor distribution of the liquid on the distributor.

In large diameter columns, the packings of the "crossed corrugation" type are not self-supporting. It is necessary, for each column section, not only to collect the liquid which falls from the upper packing section, to distribute this liquid uniformly on the lower packing section, and to promote, without excessive pressure drop, a good distribution of the rising gas, but also to support the upper packing section over all its surface and to give an upper bearing to the lower packing section.

U.S. Pat. No. 5,132,055 discloses a distributor which permits fulfilling these functions well, but which is costly to make. The distributor comprises a series of adjacent parallel profiled elements defining alternate spaces for gas and liquid. The profiled elements have a generally U-shaped section with substantially vertical wings. Each of the wings comprises a terminal portion diverging outwardly which is connected to an end portion of the wing of an adjacent profiled element. The wings are prolonged obliquely upwardly and outwardly in a half-roof which terminates in a straight upwardly directed vertical border. The profiles are disposed side by side, such that their half-roofs join, the adjacent borders bearing against each other over all their length and being secured together by weld points or crimping. To assemble a distributor of this type, there is used a series of cutouts which are bent to form the profiled elements and then secured together. Each of the cutouts is then once more cut out to length, transversely or obliquely, so as to bear at each end on a rigid crown constituted by a circular peripheral profile (see FIGS. 2 and 5 which show distributors according to the prior art). The crown is of L section comprising a lower horizontal leg and an upwardly directed external border. On this latter is secured hermetically a skirt. There will also be noted an upper anchoring angle. The production of such a distributor according to the method described above, although quite satisfactory for the distribution of fluids, is difficult and costly, particularly because of the production of the angle member and its perforation as well as its thickness being greater than that of the gutters.

The claimed invention has for its object to overcome all the mentioned drawbacks.

In particular, the invention has for its object to provide a distributor which will be rapid and easy to make.

The invention also has for its object to provide a flatter distributor after emplacement, than those of the prior art.

To this end, the distributor according to the invention is a fluid distributor for heat and material exchange columns, more particularly of the packed type, comprising profiled elements of inverted U shape with substantially vertical walls and a base in which are formed a plurality of parallel slots, each slot being covered by one of the profiled elements secured to the base by means of walls in a permanent and sealed manner.

According to other characteristics:

the profiled element is secured to two opposite edges of the slot;

the profiled elements are welded to the base;

each of the walls terminates in at least one foot turned inwardly of the element and parallel to the surface of the base, the feet serving to attach the elements to the base.

The invention also has for its object a heat and material exchange column comprising at least one distributor as defined above.

The invention also has for its object a process for the production of a fluid distributor for a heat and material exchange column, comprising the steps of:

cutting out parallel slots in a circular plate;

cutting and bending plates to form a plurality of profiled elements;

permanently securing the profiled elements over the slots so as to cover them.

An example of embodiment of the invention will now be described with respect to the accompanying drawings, in which.

Figure 1:
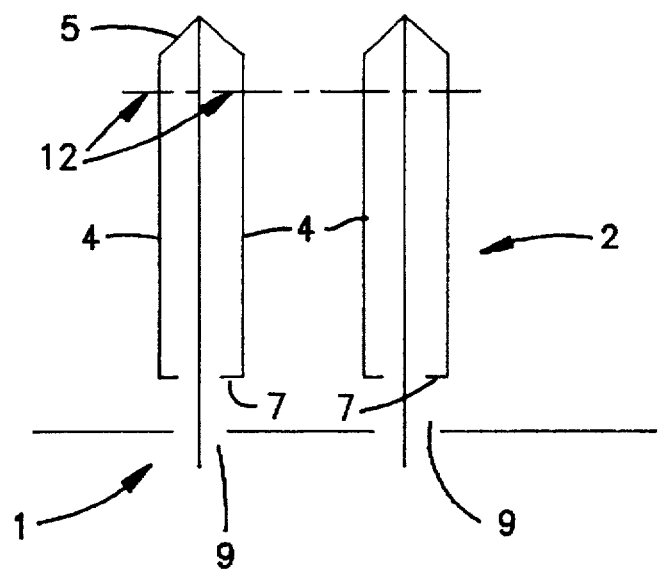
FIG. 1 is a transverse cross section partially in elevation of the distributor elements before assembly.
Figure 2:
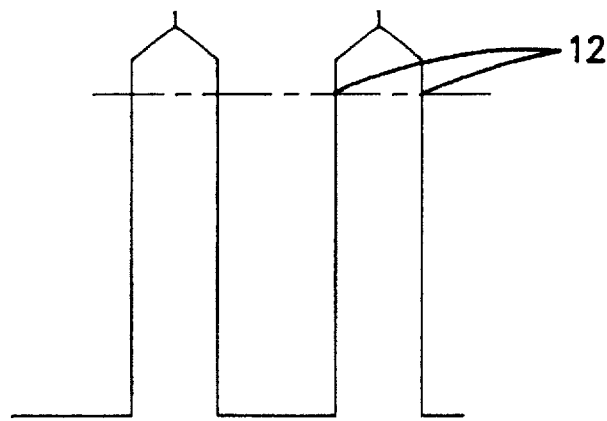
FIG. 2 is a cross section of a distributor according to the prior art mentioned above.

As shown in FIG. 1, the distributor is comprised of two principal types of elements: the horizontal perforated base 1 and the profiled elements 2, generally of inverted U shape. The U-shaped elements have two parallel vertical walls 4 joined by a roof 5.

The two walls terminate downwardly in a foot 7, bent toward the interior of the element. Each element is thus constituted by a strip of metal, bent to obtain the desired shape, without joints or welds.

Figure 3:
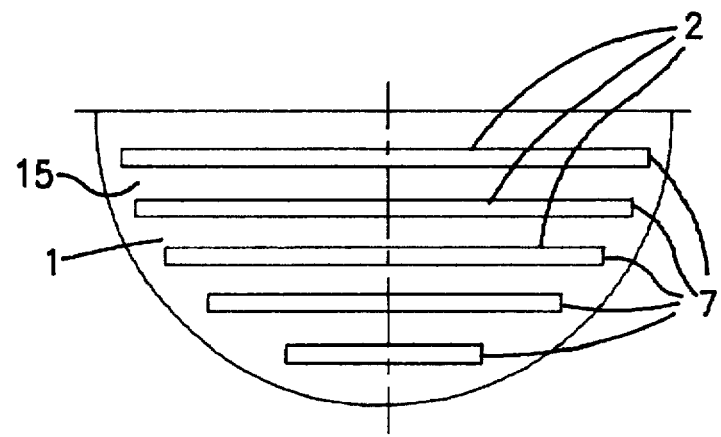
FIG. 3 is a plan view of a portion of the distributor.

The perforated horizontal base 1 is in the form of a circular plate and has slots 9. As will be seen in FIG. 3, these slots are parallel and extend almost to the edge of base 1. Base 1 can be cut out by numerical control, which permits easily providing the stair step shape constituted by the ends of the inverted U-shaped profiles 2 with the general circular shape of the column.

The slots 9 and the profiled elements 2 which constitute the gas spaces of the distributor are so dimensioned that the feet 7 can be welded to the edges of the slots, so that the profiles will cover the slots 9.

The welds on the base 1 are sealed, which was not indispensable in the earlier design: they are more than doubled. But they are very easy to reach if the distributor is assembled upside down.

The base 1 and the profiled elements 2 are of stainless steel. The profiled elements 2 are on the whole thicker than those of the prior art, because the assembly of the distributor comprises many fewer bending steps, which gives supplemental rigidity to the distributor according to the invention.

Figure 4:
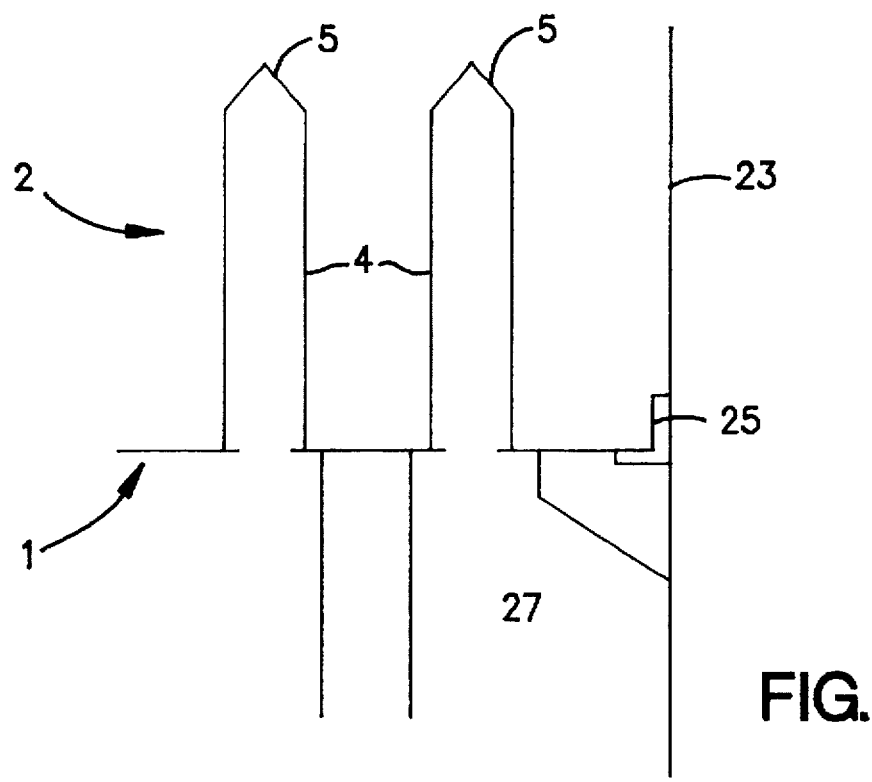
FIG. 4 shows in longitudinal cross section a portion of an air distillation column provided with a distributor according to the invention.
Figure 5:
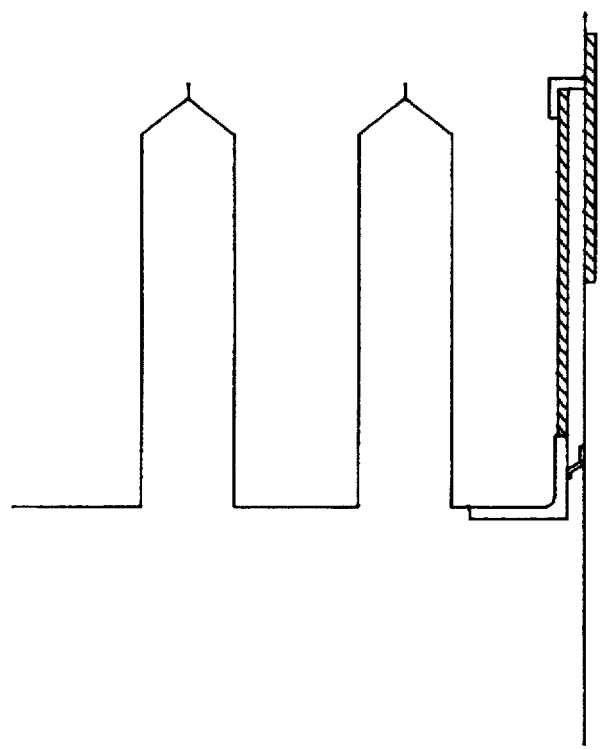
FIG. 5 is a view similar to FIG. 4, but of a construction according to the prior art noted above.

In FIG. 4, the assembled distributor 1 is welded in a sealed manner within the interior of the sleeve 23 of an air distillation column by means of a flexible peripheral profile 25, on which is directly rested the base 1 of the distributor.

The rigidity of the base thus formed is not ensured in a direction transverse to the chimneys so long as it is not mounted in the sleeve 23: the peripheral connection angle iron to the sleeve serves only to effect a sealed connection of the base with the latter and has the advantage of being relatively flexible. The planarity of the base 1 is ensured by the sleeve 23 thanks to its support gussets 27 fixed on it and spaced about the circumference of the sleeve 23 in the direction of the chimneys. The fact that the flexibility of the distributor is acceptable, before its emplacement in the column, permits great simplification of the design of the periphery.

The angle iron 25 is constituted of a circular peripheral profile of L cross section.

In operation, the liquid falls from all the surface of a pack above the distributor and is collected in the liquid spaces between the profiled elements 2. The liquid is then distributed uniformly to a lower pack thanks to the regular pattern of the holes 15 formed in the horizontal base.

At the same time, the rising gas penetrates the gas spaces and leaves them by the openings 12 above the liquid level.

The gas itself is thus distributed substantially uniformly over all the cross section of the column without excessive pressure drop in the passage of the distributor. Thanks to the fact that the openings 12 are provided in the vertical walls 4, and also thanks to their oblong shape, these openings offer an extended total area to the passage of the gas, without impeding the fall of the liquid over all the surface of the distributor and without reducing substantially the mechanical inertia of the walls 4.

Instead of being welded, the profiled elements can be assembled on the base 1 in another manner provided it is permanent and sealed.

Figure 6:
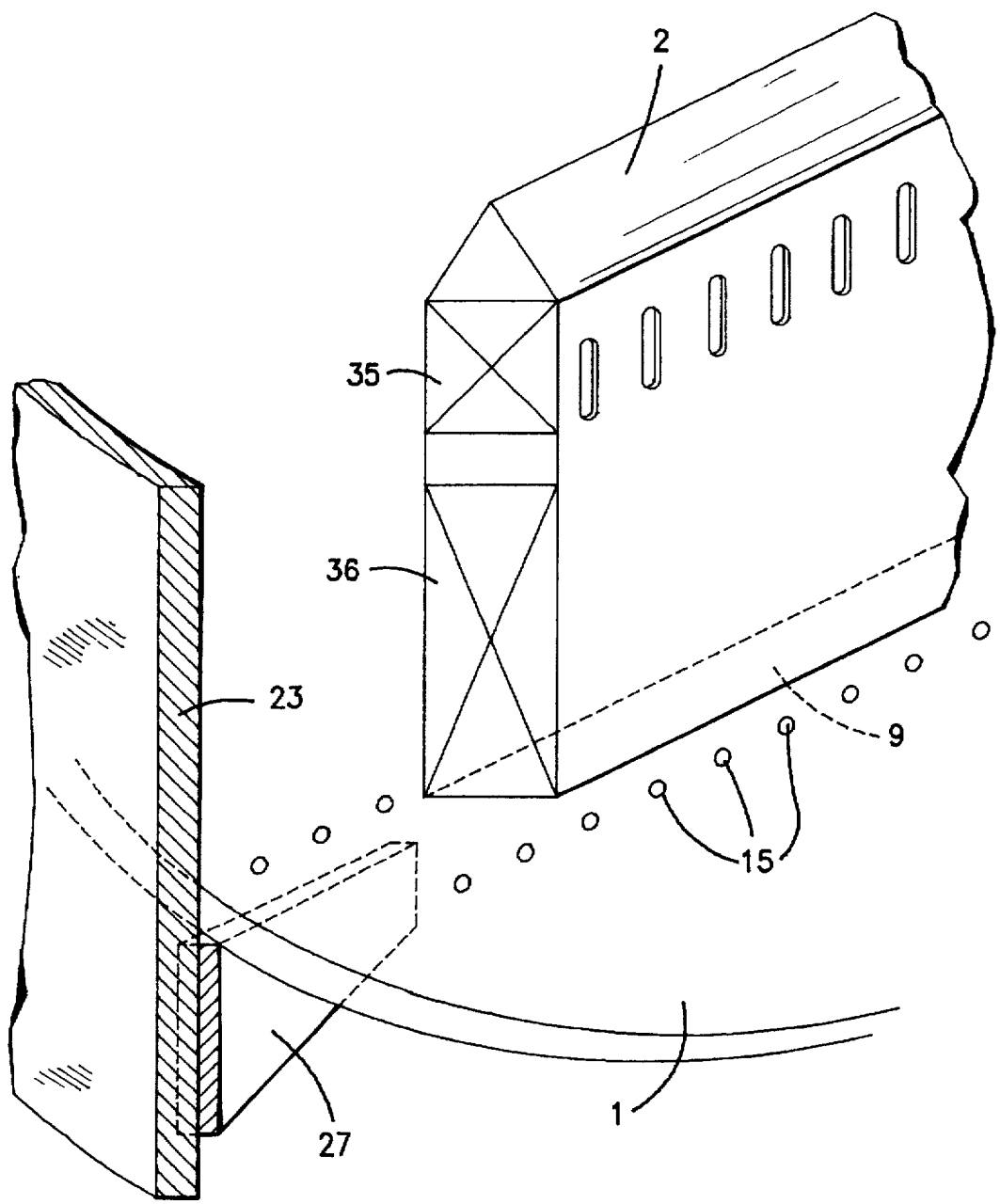
FIG. 6 shows in axial cross section a portion of an air distillation column provided with a distributor according to the invention.

As shown in FIG. 6, the distributor is mounted in the sleeve 23 by means of gussets 27 oriented along the axis of the slots 9 and profiled elements 2. A gusset 27 is positioned at the end of each slot 9.

In addition to the openings 12, the profiles 2 comprise lateral triangular openings 31 at the level of the roof 5 which distribute the gas between the profiles 2 and the sleeve 23.

Lateral intermediate openings 33 below the openings 12 serve to distribute the gases but also to permit the overflow of liquid, thereby replacing the "tulips" of the known distributors.

These openings 31 and 33 are obtained by securing to the side walls of the profiled elements 2 small plates 35 and small plates 36 to said walls and to the base in a sealed manner.

It is to be noted that the base of the distributor according to the invention is completely flat and hence particularly easy to make, in comparison with the base according to U.S. Pat. No. 5,000,883, in which the slots have a raised edge.

We claim:

1. A fluid distributor for a heat and material exchange column which comprises a plurality of the distributors in vertical registration in a sleeve, the distributor comprising:

a flat base for installation in a sleeve of a heat and material exchange column, said base having a plurality of elongated slots for upward passage of a gas and a multiplicity of perforations for downward passage of a fluid;

a plurality of elongated one-piece covers, each of said covers being bent so as to have substantially vertical walls and a gabled roof, each of said covers being sealably affixed to said base covering one of said slots, each of said walls having a plurality of gas openings in an upper portion thereof for upward passage of the gas, and each said roof being imperforate to prevent downward passage of the fluid through said slots; and a plurality of lower end plates, each of said lower end plates being affixed to said base and to said walls at an end of one of said bent covers, said lower end plates leaving an overflow space at ends of said walls so as to allow downward passage of the fluid through said overflow space but not through said gas openings in said walls.

2. The distributor of claim 1, wherein said base comprises a single flat, circular piece.

3. The distributor of claim 2, wherein each of said covers further comprises L-shaped feet at bottoms of said walls, wherein said L-shaped feet are welded to said base on opposing elongated sides of respective ones of said slots, and wherein said lower end plates are welded to said base at ends of respective ones of said slots.

4. The distributor of claim 3, further comprising a plurality of upper end plates, each being affixed to said walls at an end of one of said bent covers above said overflow space and beneath said roof so as to allow upward passage of gas through gables of said roof.

5. The distributor of claim 4 in combination with at least one further said distributor in vertical registration in a sleeve of a heat and material exchange column, said slots of the distributors in the sleeve being vertically aligned so that fluid descending through said perforations in an upper distributor does not fall on ones of said roof in the distributor therebeneath.

6. A fluid distributor for a heat and material exchange column comprising:

a plurality of one-piece covers, each of said covers being bent so as to have substantially vertical walls and an inverted V-shaped roof;

a base with a plurality of parallel elongated slots, each of said slots being covered with one of said covers, said covers being permanently and sealably affixed to said base at said walls;

a plurality of lower end plates, each of said lower end plates being sealably affixed to said base and to said walls at an end of one of said covers; and a plurality of upper end plates, each being affixed to said walls at an end of one of said covers spaced apart from and above said lower end plates and beneath said roof so as to allow upward passage of gas through eaves of said roof.

7. The distributor of claim 6, wherein said base comprises a single flat, circular piece.

8. The distributor of claim 6 in combination with at least one further said distributor in a heat and material exchange column.

9. The distributor of claim 6, wherein each of said covers is affixed to opposing sides of a respective one of said slots.

10. The distributor of claim 9, wherein each of said covers comprises L-shaped feet at bottoms of said walls which are welded to said base.

11. A method of making a fluid distributor for a heat and material exchange column which has a plurality of the distributors in a sleeve of the column, the method comprising the steps of:

forming a plurality of elongated slots and a multiplicity of perforations in a flat base for insertion into a sleeve of a heat and material exchange column, the slots being for upward passage of a gas and the perforations for downward passage of a fluid;

bending a plurality of elongated one-piece covers to form substantially vertical walls and a gabled roof;

providing a plurality of gas openings in upper portions of the walls for permitting upward passage of the gas, while leaving the roof imperforate for preventing downward passage of the fluid through the slots;

sealably affixing each of the covers to a surface of the base covering a respective one of the slots; and sealably affixing a plurality of lower end plates to a surface of the base and to the walls at ends of the bent covers, said lower end plates leaving an overflow space thereabove so as to allow downward passage of the fluid through said overflow space but not through said gas openings in said walls.

12. The method of claim 11 further comprising the step of installing the distributor in a sleeve of a heat and material exchange column.

13. The method of claim 11, wherein the base is a single flat, circular piece.

14. The method of claim 13, wherein the covers have L-shaped feet at bottoms of the walls and wherein the step of affixing the covers to the base comprises the step of welding the feet to the base on opposing elongated sides of the slots, the welding of the feet and the base being on a side of the base opposite a side with the covers.

15. The method of claim 14, further comprising the step of affixing upper end plates to the walls at ends of respective ones of the covers above the overflow space and beneath the roof so as to allow upward passage of gas through gables of the roof.

* * * * *